United States Patent [19]

Mikada

[11] 4,237,541
[45] Dec. 2, 1980

[54] ELECTRONIC APPARATUS FOR INDICATING THAT A PRINTER HAS BEEN DISABLED

[75] Inventor: Hiroyuki Mikada, Yokohama, Japan

[73] Assignee: Canon Kabushiki Kaisha, Tokyo, Japan

[21] Appl. No.: 945,116

[22] Filed: Sep. 25, 1978

[30] Foreign Application Priority Data

Sep. 30, 1977 [JP] Japan ................................. 52-118226

[51] Int. Cl.³ ............................................. G06F 3/12
[52] U.S. Cl. ...................................... 364/710; 364/900
[58] Field of Search ................ 364/710, 200, 900, 405

[56] References Cited

U.S. PATENT DOCUMENTS

| | | | |
|---|---|---|---|
| 3,971,925 | 7/1976 | Wenninger et al. | 364/900 |
| 3,976,975 | 8/1976 | Cochran | 364/900 |
| 4,003,030 | 1/1977 | Takagi et al. | 364/405 |
| 4,028,538 | 6/1977 | Olander, Jr. et al. | 364/200 X |
| 4,063,221 | 12/1977 | Watson et al. | 364/900 |
| 4,095,738 | 6/1978 | Masuo | 364/405 X |

*Primary Examiner*—David H. Malzahn
*Attorney, Agent, or Firm*—Fitzpatrick, Cella, Harper & Scinto

[57] ABSTRACT

An electronic instrument having display means and printing means is provided with informing means for informing the operator as to whether the display means or the printing means has been used. Thus, the electronic instrument becomes easier to use and suffers less from malfunctioning.

3 Claims, 13 Drawing Figures

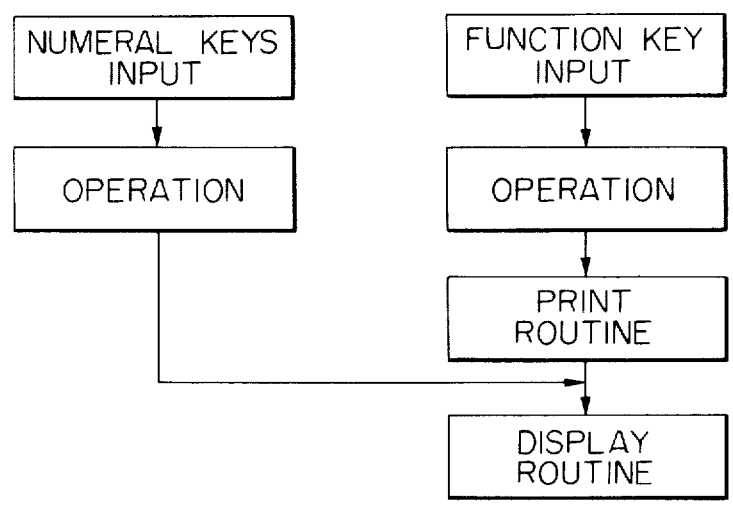

ELECTRONIC APPARATUS FOR INDICATING THAT A PRINTER HAS BEEN DISABLED

BACKGROUND OF THE INVENTION

1. Field of the Invention

This invention relates to an electronic instrument having display means and print output means.

2. Description of the Prior Art

In the conventional desk-top type printers-calculators having digital display means, the execution or non-execution of the printing has been usually controlled by the closing or opening of a switch referred to as "print switch". When the print switch is closed, both the display and the printing are executed and when the print switch is open, the display only is carried out and the printing is not.

When calculation requiring no recording is effected, it is carried out while the printing is interrupted by opening the print switch, thus helping to save the recording paper and prevent the printing noise. However, when the print switch is closed and opened in the course of a series of calculations, the calculations may sometimes be printed as if they were apparently miscalculations. In such a case, if any symbol representing the closing or opening of the print switch could be recorded on the recording paper during the calculation, such recorded symbol would be a kind of attention drawing mark to the person who is carrying out the calculation or check.

SUMMARY OF THE INVENTION

It is therefore an object of the present invention to provide an electronic instrument which includes display means and printing means and which can selectively carry out the calculation only having to be displayed and the calculation requiring the printing and which is designed such that when a calculation only having to be displayed is carried out in the course of the printing and calculation, a symbol representing the interruption of the printing and calculation is printed at the point of time whereat said interruption has taken place.

The invention will become more fully apparent from the following detailed description thereof taken in conjunction with the accompanying drawings.

BRIEF DESCRIPTION OF THE DRAWINGS

FIGS. 4A, 4B and 4C are flow charts for illustrating the present invention.

DESCRIPTION OF THE PREFERRED EMBODIMENTS

Figure 1:
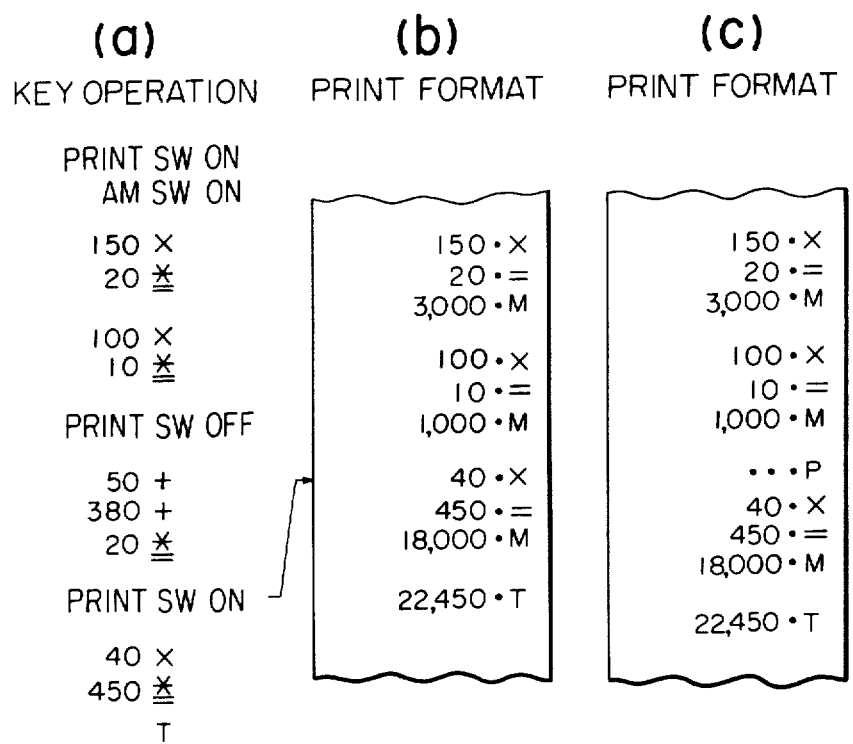
FIG. 1(a) shows an example of the key operation.
FIG. 1(b) shows an example of the print by the prior art.
FIG. 1(c) shows an example of the print by the present invention.

FIG. 1(a) shows the key operation sequence, FIG. 1(b) shows an example of the printing according to the prior art, and FIG. 1(c) shows an example of the printing according to the present invention.

Calculation is started with a print switch and an accumulation memory switch (AM switch) being closed. For example, assume that twenty commodities priced at ¥150 have been sold, and the operation is effected to calculate "150×20≚". (The ≚ key is a combined key of an addition-subtraction result read-out key * and a multiplication-division result read-out key "=".) On the recording paper, in this case, printing is effected as shown in FIG. 1(b) and the result of the operation 3,000 is automatically stored in the accumulation memory. (The symbol M represents the fact that the result of the operation 3,000 has been accumulated in the memory.) Next, 10 commodities priced at ¥100 have been sold and the operation is effected to calculate "100×10≚". as a result of which 1,000 is likewise printed and applied to the accumulation memory, and thus the content of the memory becomes 4,000. Next, assume that 50,380 and 20 commodities priced at ¥40 have been sold at three places, respectively, and it is desired that the total of the commodities be first calculated. (Other type of calculation effected by so cutting in between a series of calculations is referred to as "cut-in calculation".) In such cut-in calculation, assume that the printing is interrupted and the calculation only by display is effected and that the print switch is opened by the operator who does not want to disturb the series of calculation print formats by other type of calculation. In fact, in a situation similar to this, it is often experienced that the printing is temporally interrupted. Also, in this instance, the AM switch must needs be opened at the same time, but it is assumed that the operator has forgotten this and the AM switch is left closed. Therefore, the result 450 of the operation of "50+380+20≚" is applied to the accumulation memory so that the content of the memory becomes 4,450. However, since the printing is interrupted, it is not recorded that opening of the AM switch has been forgotten. Now, FIG. 1(b) shows that the print switch is turned back to its ON position to execute the calculation of "¥40×450" to apply the result 18,000 to the memory, whereafter the total of the sales has become 22,450 when it is called from the accumulation memory. This has become so because the heterogeneous figure 450 has been added to the memory by the opening of the AM switch having been forgotten, although the correct value of the total should originally be ¥22,000.

Such an error may sometimes occur when there is a cut-in calculation and the print switch is opened and closed, and this is difficult to find out merely by glancing at the recording paper, as shown in FIG. 1(b). This is because no where on the recording paper the record of the cut-in calculation appears and the printed content is sometimes in good order. The above-described example illustrates a case of wrong operation (or apparently wrong operation) attributable to the fact that the opening of the AM switch is forgotten when the print switch is opened.

In view of this, the present invention intends to provide informing means for recording on the recording paper a symbol ". . . P" representing the opening or closing of the print switch, thereby drawing the attention of the operator or the checker.

The present invention can also expect another novel effect by recording the ON-OFF of the print switch. For example, among business calculations, the sales bill calculation is usually checked to obtain an exact answer. However, sales bills usually consist of a set of several to several tens of leaves and it is desired to save the recording paper by opening the print switch for the purpose of checking. However, in the conventional desk-top type printer-calculator, it has usually been the case that even if the print switch is closed to effect the next bill calculation after checking has been effected with the print switch being opened, it appears as if no calculation had occurred between the two calculations. However, if, for example, the mark " . . . P" can be printed representing the closing-opening of the print switch as in the present invention, the mark " . . . P" can be utilized as the mark representing the check as shown in the key operation example of FIG. 2(a) and the print example of FIG. 2(c), and this is convenient for the later confirmation, and if the calculator executes the bill calculation by ON-OFF operating the print switch alone, the checking mark will be printed automatically and this will be a convenience.

Figure 3:
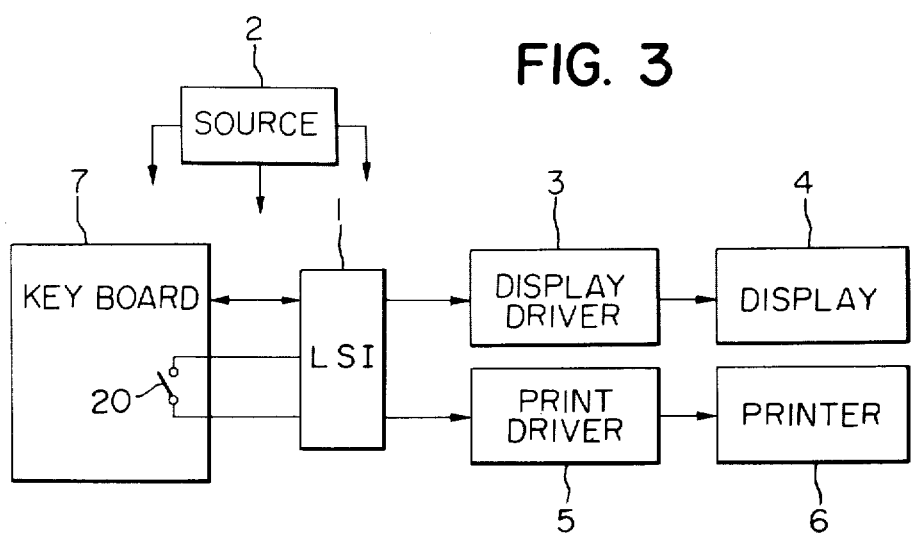
FIG. 3 is a block diagram showing the basic form of the present invention.

FIG. 3 shows a block diagram of the desk-top type printer-calculator according to an embodiment of the present invention. In FIG. 3, reference numeral 1 designates an LSI (large scale integrated circuit), 2 a power source, 3 a display driver, 4 a display device (for example, fluorescence display tube), 5 a printer driver, 6 a printer, 7 a keyboard, and 20 the above-described print switch.

Figure 4B:
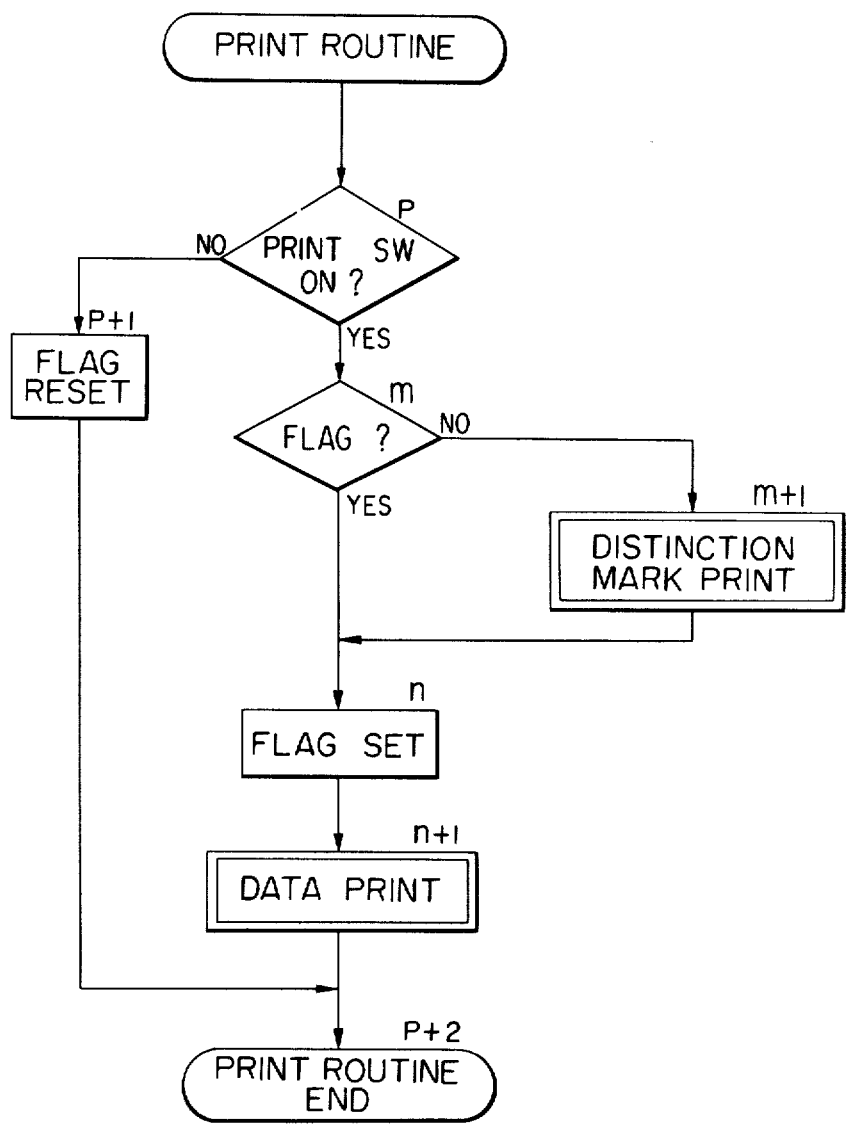

FIG. 4 shows flow charts for illustrating the present invention. FIG. 4A is a rough flow chart when the numeral keys and function keys +, −, ×, ÷, $\overset{*}{=}$, etc. have been depressed, and FIG. 4B depicts somewhat in greater detail the print routine of the FIG. 4(a) flow chart. FIG. 4C shows the instruction contents stored in the addresses P, P+1, m and n of ROM.

Figure 5:
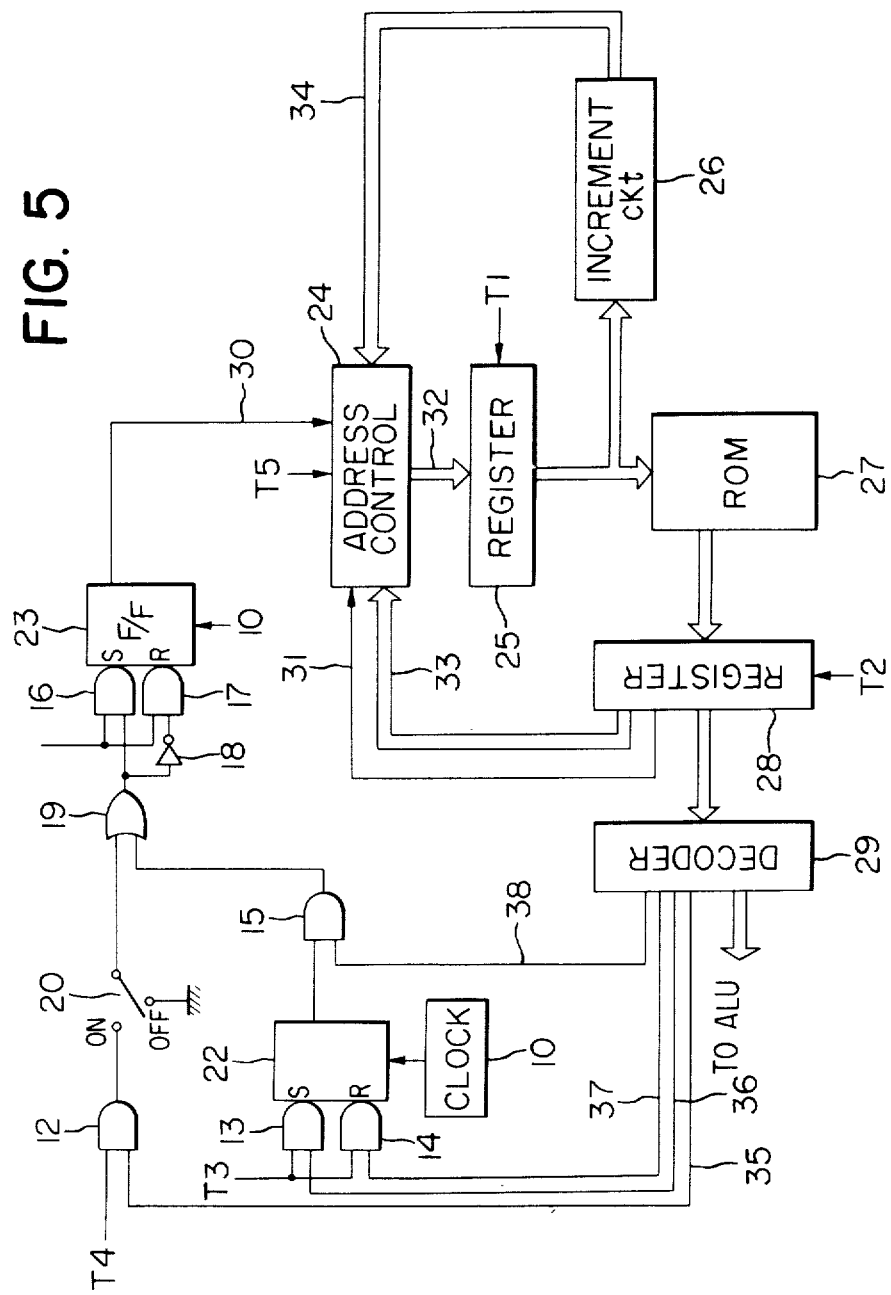
FIG. 5 is a detailed block diagram of a logic circuit for the print routine of the present invention.
Figure 6:
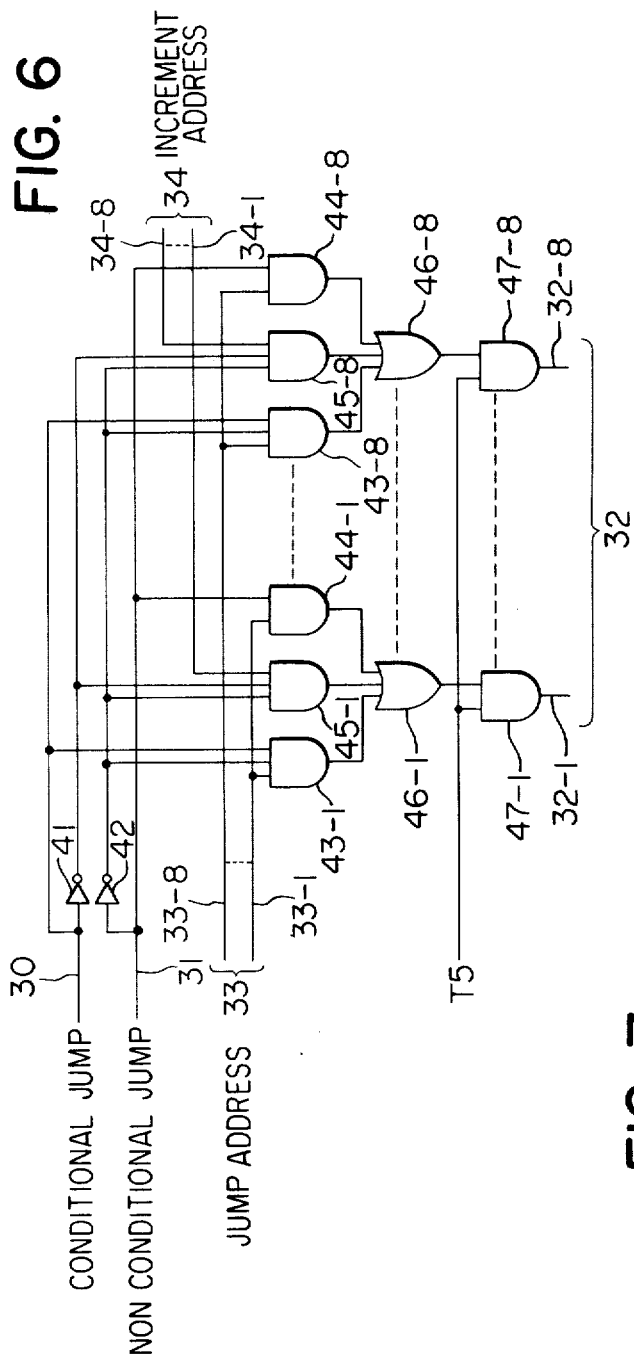
FIG. 6 is a detailed diagram of a part of the address control circuit thereof.
Figure 7:
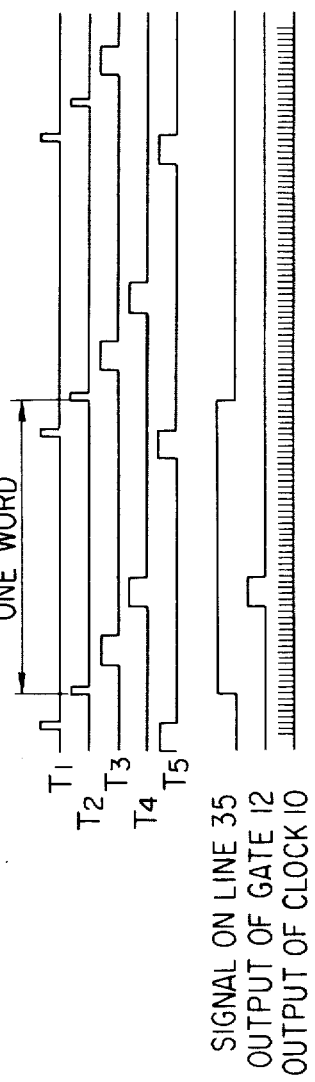
FIG. 7 is a timing chart for illustrating the operation of the present invention.

FIG. 5 shows a block diagram wherein the aforementioned print routine is realized by a logic circuit. FIG. 6 specifically shows a part of the address control circuit thereof, and FIG. 7 shows the entire timing chart. In the block diagram of FIG. 5, reference numeral 10 designates a clock, 12-17 designate AND gates, 18 designates an inverter, 19 an OR gate, 20 a print switch, 22 a flag flip-flop, 23 a condition discrimination flip-flop, 24 an address control circuit, 25 an address register, 26 an increment circuit, 27 a ROM (read only memory), 28 an instruction register, 29 a decoder, and 30-38 signal lines. Of these signal lines, the one designated by 30 is a conditional jump instruction signal, the line 31 is an unconditional jump instruction line, the line 32 is an input line to the address register 25, the line 33 is one for transmitting the next address of the jump instruction to the address control circuit 24, the line 34 is an address input line having added 1 to the output of the address register 25, the line 35 is one for instructing the sensing of the print switch, the line 36 is a set instruction line of the flag flip-flop 22, the line 37 is a reset instructing line of the flag flip-flop 22, and the line 38 is a sense instructing line of the flag flip-flop 22. As mentioned above, FIG. 6 is a part of the address control circuit 24, which includes inverters 41, 42, and AND gates 43-1–43-8, 44-1–44-8 and 45-1–45-8. Designated by 46-1–46-8 are OR gates and 47-1–47-8 AND gates.

The basic operation of the block diagram of FIG. 5 will now be described by reference to the timing chart of FIG. 7. First, the content of the address designated by the address register 25 is read out from the ROM 27 and introduced into the register 28 as an instruction. Subsequently, the instruction introduced into the register 28 is applied to each gate through a decoder 29 to set or reset the flip-flops 22 and 23 in accordance with conditions. Depending on the content of the instruction, the address control circuit 24 conveniently selects the address of the next word time and stores the same in the address register 25. The above-described cycle is completed in one word as shown in FIG. 7, and as the beginning of the word, the pulse T2 at which the instruction register 28 reads in the instruction is employed. As an example of the operation, the operation of the key operation sequence shown in FIG. 2(a) will be described. Assume that in the initial state, the print switch 20 has been closed. When the numerals are entered in the sequence of [1], [2], [6], "126" is read into the desk-top type printer-calculator and displayed as "126." on the display device. In this case, as shown in FIG. 4A, the print routine does not pass. Next, when the [+] key is depressed, the printer-calculator executes the necessary operation and treatment, whereafter the print routine is entered. Thus, when the content of the address register 25 has become P address by the read-in pulse T1 of FIG. 7, the ROM 27 puts out the content of the P address as an instruction, which is read in by the instruction register 28 at the timing of T2. According to FIG. 4C, the content of this instruction is the sense instruction of the print switch and therefore, it is decoded by the decoder 29 so that the signal 35 becomes 1 during one word. In this case, the decoder and the instruction are designed such that the signal lines 36, 37, 38 and 31 assume 0 and m appears at 33, and therefore the set input of the flip-flop 23 assumes 1 at the timing of T4, so that the flip-flop 23 is set by the clock pulse from the clock 10 immediately thereafter. Accordingly, the conditional jump instruction line 30 assumes 1 to open each of the gates 43-1 to 43-8 in FIG. 6, and the jump address m appears at 32 at the timing of T5. At the timing of T1, the address register 25 reads in this and puts out the content of the m address of the ROM 27 as an instruction. This completes one word and the routine from P address to m address of FIG. 4B has been followed. Likewise thereafter, the sense instruction 38 of the flag flip-flop 22 is put out on the m address instruction and the flip-flop 23 is set or reset at the timing of T4. Assume that the flag flip-flop 22 has been set. Then, the conditional jump is established and the address of the next word becomes n address. At the n address, the instruction has become a set instruction for the flag, so that 36 assumes 1 (31, 35, 37 and 38 assume 0), whereby the flag 22 is set at the timing of T3. At the same time, the gates 45-1 to 45-8 are each opened so that the address 34 having become n+1 through the increment circuit 26 appears at 32 at the timing of T5, and this is read in by 25 at the timing of T1, thereby determining the next address as n+1. (In the case of the conditional jump of the p and m addresses, if the condition is not established, advance is also made to p+1 and m+1 by following the same process as shown herein.)

The address n+1 is the leading address of the routine for printing the data of "126.+", but since the detailed process of this print permits the use of the well-known technique, it is simply represented by a double box as in [DATA PRINT]. If the data print has been terminated at u address, the unconditional jump instruction 31 is 1 on the instruction at the u address and the jump address p+2 is generated at 33, whereby each of the gates 44-1 to 44-8 is opened, so that the print routine is terminated with the next address as P+2, thus advancing to the next display routine. In the display routine, various operations are effected for causing the display tube to effect the display "126·".

Thereafter, the keys [4][5][3][+] ... are operated and the same process as that described hitherto takes place until "2,260·" is printed by the key after [4][1][+].

Now, assume that the print switch has been opened for the checking. Then, this printer-calculator stops its printing function and operates in a manner similar to a display calculator.

In order to effect the checking, if each term is subtracted from the result of the operation in a sequence and an answer "0·" is displayed when the last term is subtracted, it can be confirmed that the previous operation result is correct. Thereupon, if [2][2][6][0] are entered, the display "2,260·" appears.

When the [+] key is depressed then, the address becomes the leading address P of the print routine after the necessary operation has been done. At the P address, the print switch is sensed but the print switch 20 has already been opened, so that the flip-flop 23 is reset at the timing of T4 and the line 30 assumes 0.

At this time, the conditional jump is not established and the address advances to the P+1 address as already noted.

At the P+1 address, the signal for resetting the flag 22 assumes 1 so that the flag 22 is reset at the timing of T3, and advance is made to the next P+2 address, thus completing the print routine and going to the display routine. Here, after all, the print is not executed but the flag is simply reset. In the operation of the subsequent subtraction, the print is not executed but the check advances and the display becomes "0·" by the key [±], thus confirming that "2260" is a correct answer. Since the check has been completed, the print switch is again closed to effect a bill calculation. First, the keys [5][2][0] are depressed and [+] key is depressed, whereupon the print routine exhibits a function different from what has been done so far. That is, the address advances P→m and at the address m, the flag 22 is at 0 so that the conditional jump is not established and the address passes through the [DISTINCTION MARK PRINT] routine to advance to the m+1 address.

Figure 2:
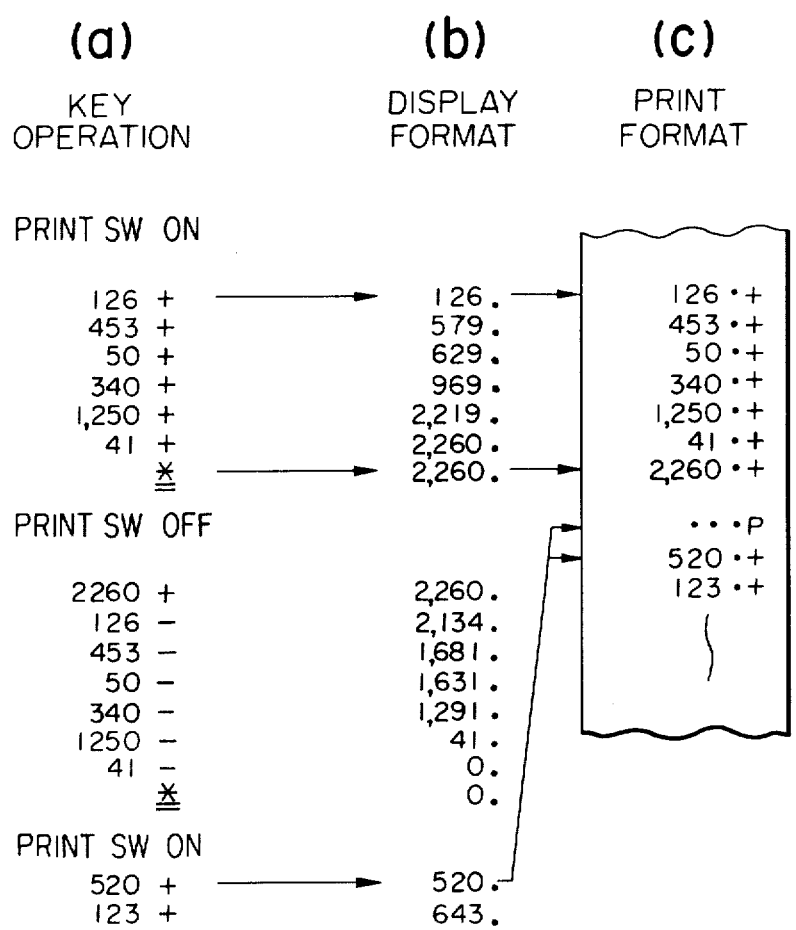
FIG. 2(a) shows an example of the key operation.
FIG. 2(b) shows an example of the display thereof.
FIG. 2(c) shows an example of the print by the present invention.

Thus, distinction mark "... P" is printed as shown in FIG. 2(c). In the present embodiment, the "distinction mark" is explained by the print "... P", whereas there are numerous other expressions and "... P" is not restrictive. In order to have the "distinction mark" printed, the print data must actually be prepared and printed, but this can be simply practised by the known art and is not described in detail herein.

Now, when the print of the distinction mark has been completed, jump is made to n address at the unconditional jump to set the flag and print the data (here, "520·+"), thus completing the print routine and displaying "520·" in the display routine, as described hitherto (See FIG. 4).

From the next [1][2][3][+], the printing entirely similar to that when the print switch is closed is executed.

In the manner described hitherto, the closing-opening of the print switch can be recorded on the recording paper and this leads to the various advantages noted previously.

What I claim is:

1. In an electronic apparatus having a display, a combination comprising:
    printing means;
    control means connected to said print means for enabling and disabling the operation of said printing means; and
    means connected to said control means for providing an indication that said printing means was disabled when said printing means is enabled after having been disabled by said control means.

2. An electronic apparatus having a display according to claim 1, wherein said control means includes a manual switch.

3. An apparatus according to claim 1, wherein said indicating means is connected to said printing means and includes means for causing said printing means to print on a recording sheet a pattern representing that said printing means was previously disabled.

* * * * *